US00RE36543E

United States Patent [19]

Yada et al.

[11] E Patent Number: Re. 36,543

[45] Reissued Date of Patent: Feb. 1, 2000

[54] METHOD OF MANUFACTURING AUTOMOBILE WINDSHIELD MOLDING

[75] Inventors: Yukihiko Yada, Nagoya; Yoichi Hirai, Obu, both of Japan

[73] Assignee: Tokai Kogyo Kabushiki Kaisha, Ohbu, Japan

[21] Appl. No.: 08/504,837

[22] Filed: Jul. 20, 1995

Related U.S. Patent Documents

Reissue of:

[64] Patent No.: 5,229,054
Issued: Jul. 20, 1993
Appl. No.: 07/800,831
Filed: Nov. 29, 1991

[30] Foreign Application Priority Data

Nov. 30, 1990 [JP] Japan ..... 2-340853

[51] Int. Cl.[7] ..... B29C 47/18

[52] U.S. Cl. ..... 264/167; 264/177.16; 264/177.2; 425/465; 425/466

[58] Field of Search ..... 264/167, 177.16, 264/177.2, 177.17, 177.19; 425/465–467, 381

[56] References Cited

U.S. PATENT DOCUMENTS

| | | | |
|---|---|---|---|
| 4,256,685 | 3/1981 | Vassar | 264/177.1 |
| 4,419,315 | 12/1983 | Kessler | 425/465 |
| 4,584,150 | 4/1986 | Ballocca | 264/177.2 |
| 4,865,796 | 9/1989 | Tamura et al. | 164/177.2 |
| 4,960,375 | 10/1990 | Saito et al. | 425/131.1 |
| 5,061,335 | 10/1991 | Tamura et al. | 264/177.1 |

FOREIGN PATENT DOCUMENTS

| | | |
|---|---|---|
| 0115750 | 8/1984 | European Pat. Off. . |
| 59-70528 | 4/1984 | Japan . |
| 62-280019 | 12/1987 | Japan . |
| 63-8020 | 1/1988 | Japan . |
| 63-8021 | 1/1988 | Japan . |
| 1-204713 | 8/1989 | Japan . |

*Primary Examiner*—Jan H. Silbaugh
*Assistant Examiner*—Mark Eashoo
*Attorney, Agent, or Firm*—Oblon, Spivak, McClelland, Maier & Neustadt, P.C.

[57] ABSTRACT

A method of manufacturing a windshield molding by the extrusion process. The molding includes a pair of extruded side molding parts and an extruded upper molding part integral with and extending between the side molding parts. The side molding parts have large thickness portions where water drain channels are formed. The water drain channels have sufficient capacity to guide fluid such as rain water from the outer surface of the windshield.

12 Claims, 19 Drawing Sheets

METHOD OF MANUFACTURING AUTOMOBILE WINDSHIELD MOLDING

Matter enclosed in heavy brackets [ ] appears in the original patent but forms no part of this reissue specification; matter printed in italics indicates the additions made by reissue.

BACKGROUND OF THE INVENTION

Field of the invention

This invention relates to a method of manufacturing a windshield molding for a motor vehicle body to seal the space between a windshield and a periphery of a window opening of vehicle body panels.

Description of the Related Art

An automobile windshield molding is usually attached around a peripheral edge of a windshield to seal the space between the windshield and a window opening of vehicle body panels. The windshield molding (hereinafter called "molding") is a strip comprising a leg portion to be inserted in the foregoing space and an upper decorative portion for sealing the space between the windshield and the vehicle body panels.

Examples of such molding are disclosed in Japanese Utility Model Publication No. 54416/1982 and Japanese Utility Model Laid-Open Publication No. 9811/1989. These citations disclose moldings having water drain channels for guiding water flowing on the surface of the windshield. The molding is divided into a portion without a water drain channel and a portion with a water drain channel. These molding portions are separately produced, and are then coupled as one unit by an injection molder. When they are coupled, there may be lines between joined areas of the molding parts, which would somewhat damage an external appearance of the molding.

To overcome the foregoing drawbacks, a variety of proposals have been made in Japanese Patent Laid-Open Publications 195032/1989, 202518/1989, 8019/1988, 269611/1989, 269612/1989, 269,613/1989, 291721/1988, and 244820/1989, and Japanese Utility Model Laid-Open Publication 128411/1989.

In 195032/1989, the molding has a uniform cross-sectional shape, and a portion for a water drain channel is removed where no water drain channel is necessary.

In 202518/1989, a water drain channel portion of the molding has it's shape continuously.

In 8019/1988, the molding has a uniform cross-sectional shape, being deformed at a portion where a water drain channel is to be formed.

In 269612/1989, the molding has a uniform cross-sectional shape. The molding has a leg portion, which is partially cut to form spaces for receiving a windshield and for forming a water drain channel.

In 291721/1988 and 244820/1989, the molding has two extending portions to form a pair of grooves, and one of the extending portions is cut where no water drain channel is necessary.

The citation 128411/1989 discloses a molding, in which a corner joint is used to connect upper and side molding parts.

With 269611/1989 and 269613/1989, an upper decorative portion of the molding has a uniform cross-sectional shape, and a portion for receiving the windshield is reshaped.

The foregoing moldings however suffer from drawbacks as described hereinafter.

With the citation 195032/1989, the molding has a sharp edge on its decorative portion. Such sharp edge should be removed later, and the cut portion should be rounded. This would adversely affect the external appearance of the molding. Further, it is impossible to gradually change the size of the groove as desired.

Japanese Patent Laid-Open Publication No. 202518/1989 does not indicate how to make the drip portion serving as a water drain channel or disclose the means for gradually changing the cross-sectional shape of the drip portion. Therefore, it is not known how to form the whole molding in the strip form.

The moldings of 8019/1988 and 269612/1989 have grooves for water drain channels, which are somewhat insufficient to guide water.

With 291721/1988 and 244820/1989, the depth of the grooves of the molding cannot be changed serially. The molding is difficult to attach in the window opening of the automobile since a portion of the molding is cut to serve as a water drain channel. With 244820/1989, dies should be modified to make a molding.

With citations 269611/1989, and 269913/1989, the depth of the grooves can be serially changed. However, at the upper molding part where no water drain channel is formed, the portion of the molding in contact with the surface of the windshield should be housed in the decorative portion. Therefore, the decorative portion should be made large, which would adversely affect the external appearance of the upper molding part, and reduce the field of view from the driver's position. Such large upper molding part might be contrary to a demand for a flush surface between the windshield and the vehicle body panels. At the corner molding parts, the molding might be wrinkled since the thin decorative portion is curved sharply.

To overcome the foregoing drawbacks, applicants have proposed in a co-pending application (not laid open for public inspection as of Nov. 30, 1990) a molding 1 and a molding machine as shown FIGS. 30 to 33 of the accompanying drawings. The molding comprises an upper molding part 1A, a pair of corner molding pats 1B, and a pair of side molding parts 1C. These molding parts 1A, 1B, 1C have cross-sectional shapes as shown in FIGS. 30 to 32, respectively. The molding is manufactured by the extrusion process so as to have the foregoing cross-sectional shapes in a continuous manner. As can be seen in these figures, only the shape of decorative portion 1a of the molding 1 is changed with side molding part 1C. The decorative portion 1a of the side molding part 1C extends upwardly, thereby forming grooves 1c thereon.

The molding 1 is manufactured by dies of the molding machine 2 shown in FIG. 33. The molding machine 2 comprises a stationary square die 21, and a sectorial movable die 22 for covering an opening 21a, which is shaped according to the decorative portion of the molding. The center of the sectorial die 22 is movable in front of the stationary die 21 by a pin 23, so that the opening 21a of the stationary die 21 changes its shape according to the decorative portion 1a of the molding 1. Thus, the profile of decorative portion 1a is changed.

The molding 1 can offer a water drain channel which has a sufficient capacity and whose shape is gradually changed. However, an edge of the decorative portion 1a becomes sharp, especially for the corner molding part 1B which has started to become thicker. Such sharp edge of the corner molding part would be disadvantageous in terms of safety or not meet the safety requirements. The sharp edge might look like a line, which would damage the external appearance of the molding.

SUMMARY OF THE INVENTION

It is an object of this invention to provide a method of manufacturing by the extrusion process a windshield molding, wherein shape is varied according to positions where the molding is to be installed in a window opening of a vehicle, keeping a good external appearance at bent portions.

According to the invention, there is provided a method of producing a strip of an automobile windshield molding for sealing a space between a windshield and a window opening of a vehicle body by using a molding machine, which includes a first die having an opening corresponding to a cross-sectional shape of a molding, a second die being angularly movable to cover part of the opening of the first die to change the area of the opening, and a third die being rectilinerly movable into and from the opening of the first die. The proposed method comprises: (a) extruding molding material through the opening formed by first and second dies to form a pair of side molding parts, a pair of corner molding parts and an upper molding part in succession; (b) changing the shape of the opening by moving dies according to the cross-sectional shapes of the side, corner and upper molding parts to be made; (c) widening part of the opening to increase the thickness of the molding material in the sector shape at a portion corresponding to the cross-sectional shape of the side molding part; (c) advancing the third die into the widened part of the opening at a specified time to form a water drain channel on the large thickness portion of the side molding part; and (d) reducing part of the opening to decrease the thickness of the widened part of the molding material and making each of the corner and upper molding parts.

A more complete appreciation of the invention and many of the attendant advantages thereof will be readily obtained as the same becomes better understood by reference to the following detailed description when considered in connection with the accompanying drawings, wherein:

DETAILED DESCRIPTION OF THE PREFERRED EMBODIMENTS

Figure 1:
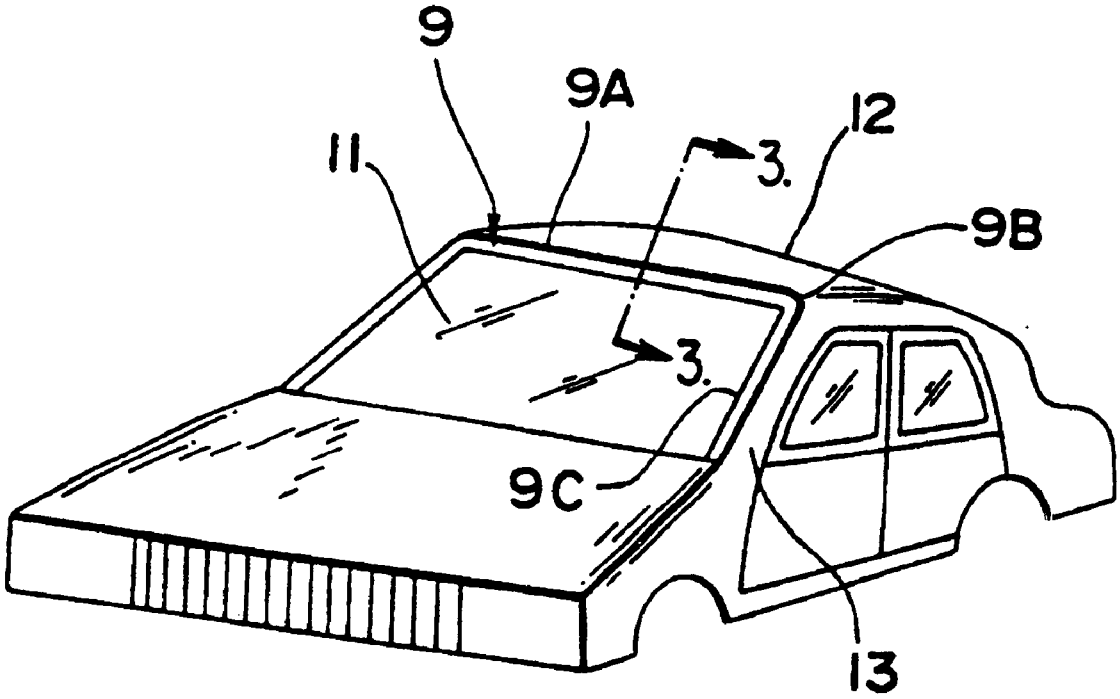
FIG. 1 is a front perspective view of a vehicle body having a windshield molding.

As shown in FIG. 1, a molding 9 is installed to seal the space between a windshield 11 and a periphery of a window opening of vehicle body panels. The molding 9 is an extruded strip in the shape of T, being made of elastic material such as rubber or plastic, and comprising a pair of side molding parts 9C and an upper molding part 9A integral with and extending between the side molding parts 9C via corner molding parts 9B. The upper molding part 9A is mounted between the upper edge of the windshield 11 and a roof panel 12. The corner molding parts 9B are mounted at the corner portion of the window opeing, connecting the upper and side molding parts 9A, 9C.

Each of the side, corner and upper molding parts includes a leg portion 92 and a decorative member 91. The leg portion 92 is inserted into a space between the peripheral edge of the windshield 11 and the vehicle body panels 12, 13. The decorative member 91 covers the peripheral edges of the windshield 11 and the vehicle body panels 12, 13.

A core metal 93 is longitudinally embedded in the leg 92 near the joint with the decorative member 91.

The leg 92 terminates in a foot 94 and a flexible lip 95 extending toward the vehicle body panels 12, 13.

The decorative member 91 has an inward wing 91a for covering the edge of the windshield 11, and an outward wing 91b for covering the edges of the vehicle body panels 12, 13. The inward wing 91a and the foot 94 define a U-shaped space for receiving the peripheral edge of the windshield 11.

Figure 2:
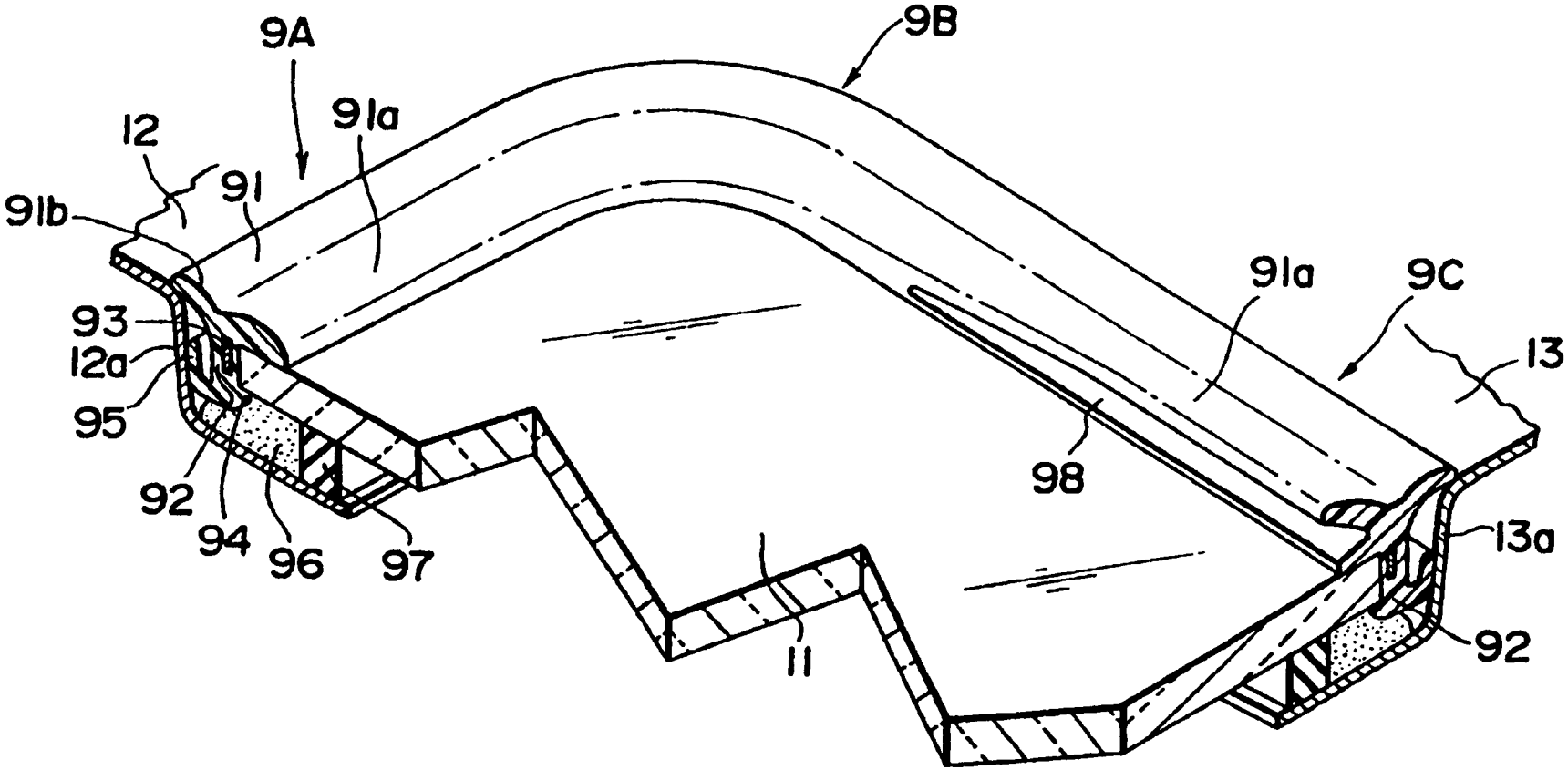
FIG. 2 is a perspective view of a windshield molding at a corner part, according to a first embodiment of the invention.

The side, corner and upper molding parts have essentially a uniform cross-sectional shape. Specifically, the leg portion 92, foot 94, flexible lip 95 and outward wing 91b have uniform cross-sectional shapes throughout the molding parts. This is because the molding 9 is intended for a vehicle having a uniform difference of height between the [upper] *exposed* surface of the windshield 11 and the vehicle body panels. However, the inward wing 91c of the side molding part 9C has a large thickness portion as shown at the lower right part of FIG. 2.

Figure 5:
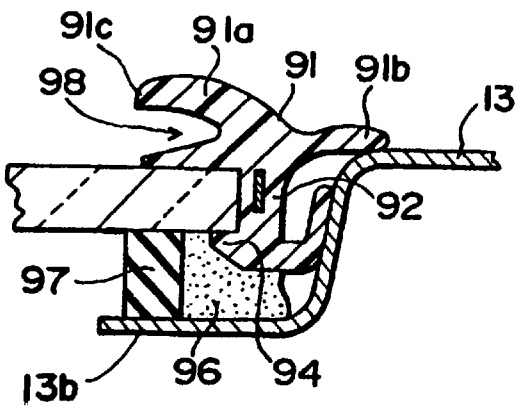
FIG. 5 is a cross-sectional view taken along line $Y_2$—$Y_2$ of FIG. 3
Figure 6:
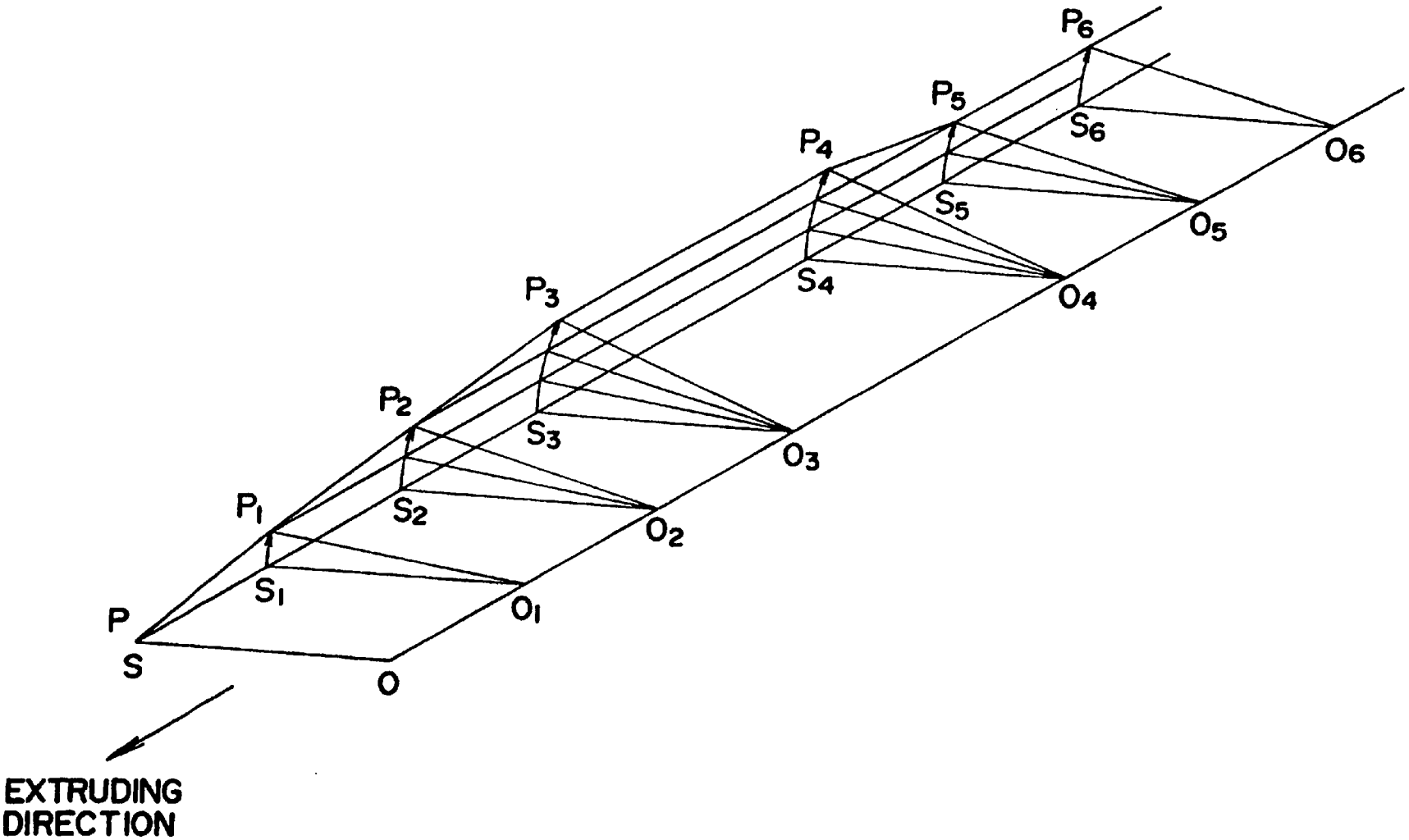
FIG. 6 is a schematic perspective view showing the surface of a side molding part of FIGS. 1 to 5.

The inward wing 91a however bulges gradually at the majority of the side molding part 9C. The inward wing 91a is thickest near the center of the side molding part 9C as shown in FIG. 5, and remaining thickest toward the end thereof. The inward wing 91a bulges as if it rotates with a radius OP *out of the vehicle about an axis in the longitudinal direction of the molding*, being contoured as shown by $O_1P_1$, $O_2P_2$, . . . , $O_5P_5$, $O_6P_6$, in FIG. 6.

Figure 4:
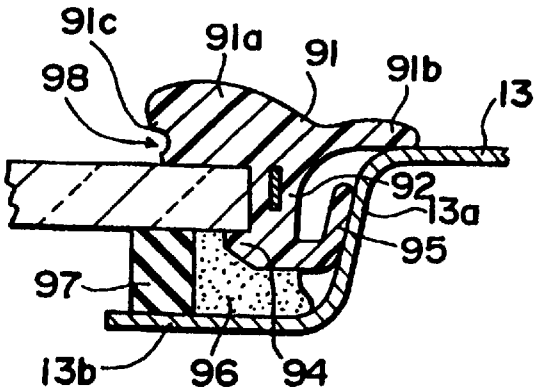
FIG. 4 is a cross-sectional view taken along line 4–4 of FIG. 3.

As it bulges gradually the inward wing 91a is formed with a wall 91c, as shown in FIGS. 4 and 5. The wall 91c has an arcuate surface whose central axis longitudinally agrees with the border between the inward wing 91a and the outward wing 91b. The arcuate surface of the wall 91c is gradually widened as the inward wing 91a bulges.

A water drain channel 98 is formed on the wall 91c of the inward wing 91a near the corner molding part to the end of the side molding part 9C, being shaped in a sideways V. The size of the water drain channel 98 is varied according to the changing shape of the inward wing 91a as described above.

The molding 9 is attached around the windshield 11 in the following order, i.e. the side molding part, corner molding part, upper molding part, corner molding part, and side molding part. Specifically, the peripheral edge of the windshield 11 is received in the space formed by the inward wing 91a, leg portion 92 and foot 94 of the molding 9. The corner molding part 9B is curved according to the shape of the corner of the window opening, being attached without wrinkles, since the side molding part 9C is gradually thickened.

A dam rubber 97 in the strip shape is fastened on flanges 12b, 13b of the vehicle body panels 12, 13. An adhesive 96 is filled between the dam rubber 97 and the flanges 12b, 13b. The windshield 11 with the molding 9 attached therearound is placed on the dam rubber 97, so that the foot 94 is positioned by the dam rubber 97, and the flexible lip 95 is bent in an L-shape to come into flexible contact with slanting walls 12a, 13b of the body panels 12, 13. Thus, the molding 9 is firmly fixed in the specified position.

The windshield 11 is attached on the flanges 12b, 13b at a uniform height. The positional relationship between the molding 9 and the vehicle body panels is uniform throughout the whole area.

With the molding 9, the water drain channel 98 guides fluid such as rain water on the windshield 11 to a specified position.

The molding 9 is firstly attached around the windshield 11, and then installed in the window opening of the vehicle body panels. Otherwise, the molding 9 is inserted in the space between the windshield, which has been already attached in the window opening, and the vehicle body panels.

Figure 7:
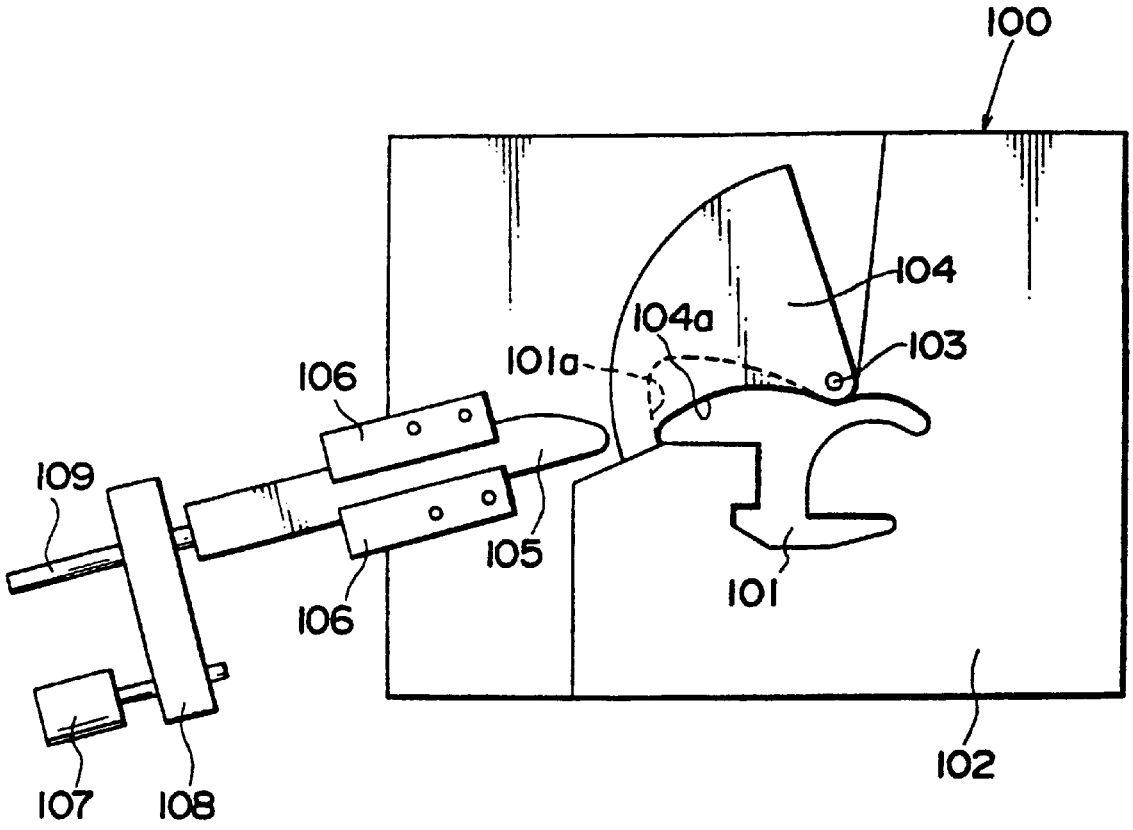
FIG. 7 is a front elevational view showing one example of a molding machine for manufacturing the molding of FIGS. 1 to 6.

A molding machine for producing the molding 9 will be described with reference to FIGS. 7 and 9.

The molding machine 100 includes first to third dies for extruding plastic material. The first die 102, second die 104 and third die 105 are positioned parallel to the direction (perpendicular to the plane of FIG. 7) in which the molding 9 is to be extruded.

The first die 102 is stationary, having an opening 101 corresponding to the cross-sectional shape of the molding 9. A portion of the opening 101, which corresponds to the inward wing 91a, is adjusted its shape by moving the second die 104 as shown by dotted lines in FIGS. 7 and 9 to form the bulging inward wing 91a.

The second and third dies 104, 105 are of plate members, being supported to be movable in front of the first die 102. The second die 104 is substantially sectorial and is turned. An arcuate side 104a of the second die 104 is shaped according to the contour of the inward wing 91a. The second die 104 is positioned over the opening 101 at the portion for forming the inward wing 91a. The second die 104 is turned centrally of a fulcrum 103, which is located at a position corresponding to the border between the inward and outward wings 91a, 91b, being operated to change the shape of the opening 101 according to the shape of the inward wing 91a.

When the second die 104 is turned, the outer edge of the side 104a in the radius direction follows an arcuate orbit. The side 101a of the opening 101 of the first die 102 and the outer edge of the side 104a of the second die 104 are formed with arc in accordance with the arcuate orbit of the second die 104. The center of the arcuate form of the side 101a of the opening 101 substantially agrees with the movement center of the second die 102.

The third die 105 is guided by a pair of guides 106 to be rectilinearly movable. The third die 105 is connected to a motor 107 via an operating lever 109 and a converter 108. The rotary motion of the motor 107 is converted into the rectilinear motion by the converter 108, so that the third die 105 is reciprocated between the positions for making the upper molding part and the side molding part.

Figure 8:
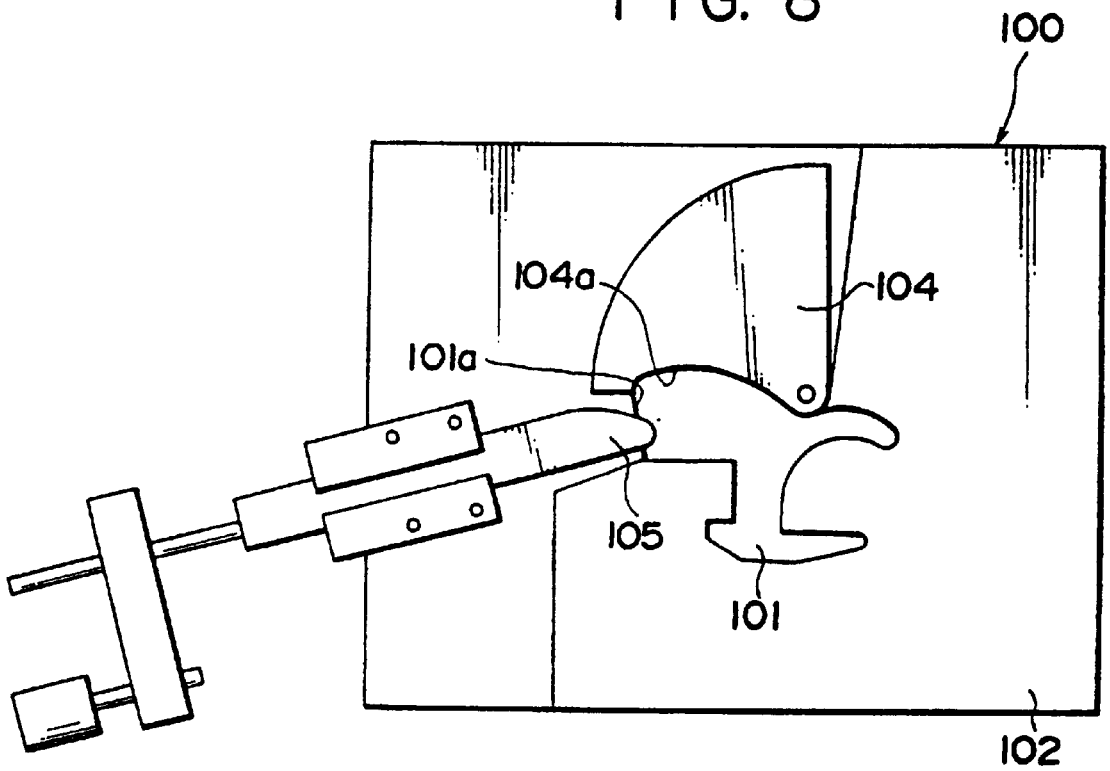
FIG. 8 is a front elevational view showing movement of dies of the molding machine.

The third die 105 has a triangular tip, which is movable into and from the opening 101 corresponding to the shape of the water drain channel 98 on the inward wing 91a. As shown in FIGS. 7 to 9, the third die 105 is operated in response to the operation of the second die 104.

In operation, plastic material will be extruded to form the molding 9 in the strip shape in the order of the side molding part 9C, corner molding part 9B, upper molding part 9A, corner molding part 9B, and side molding part 9C.

Figure 3:
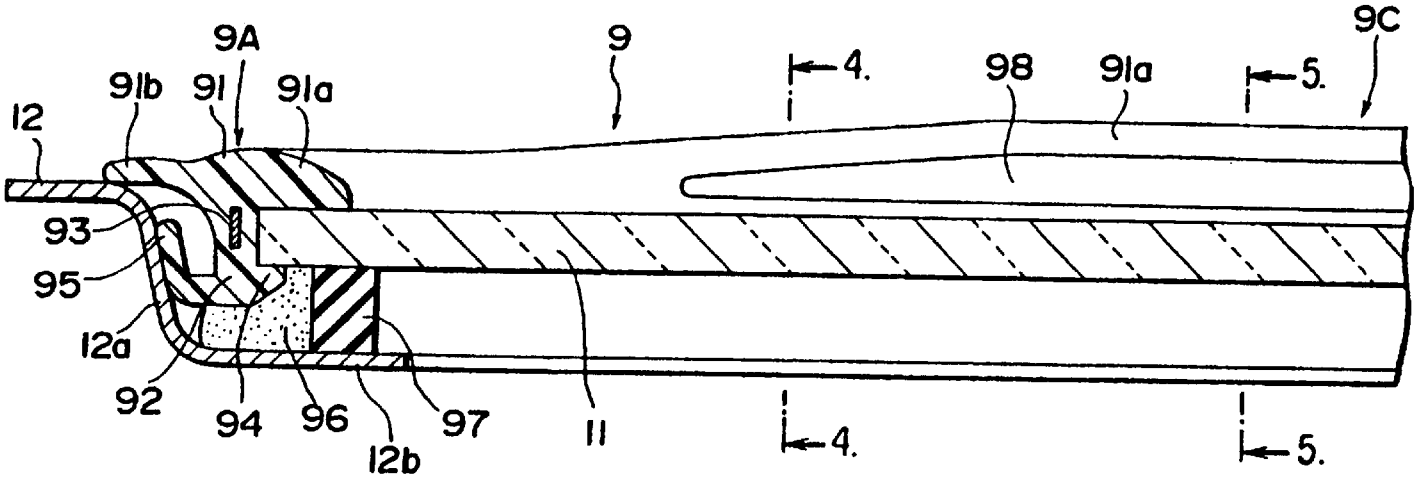
FIG. 3 is a cross-sectional view taken along line 3—3 of FIG. 1.
Figure 9:
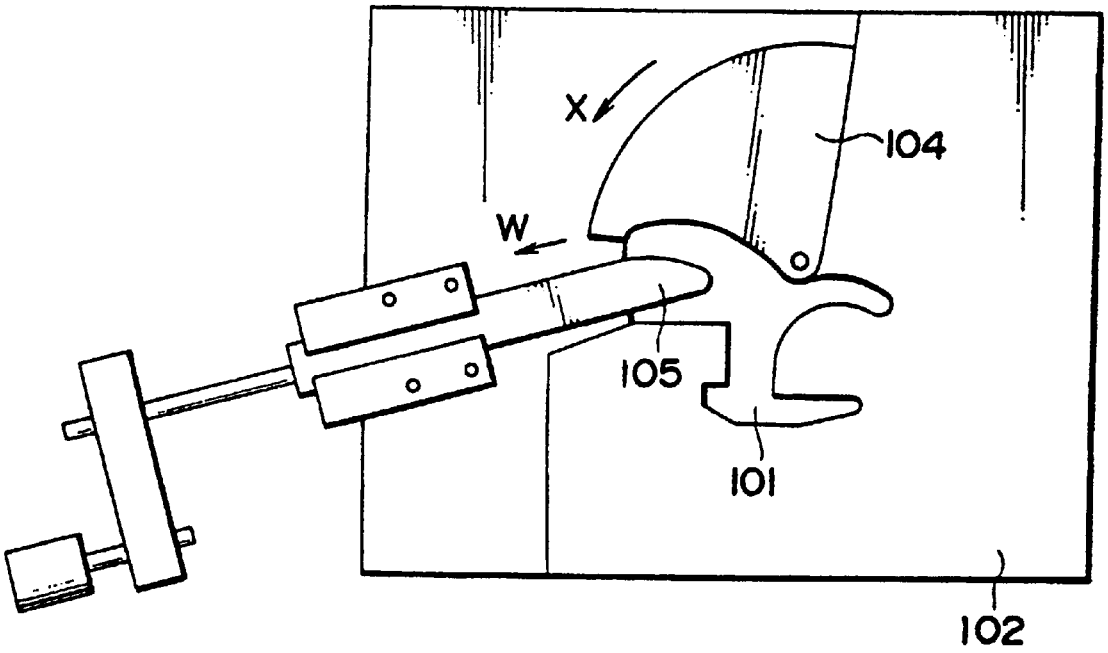
FIG. 9 is a front elevational view showing further movement of the dies of the molding machine.

The three dies 102, 104, 105 are mutually positioned as shown in FIG. 9 to form a side molding part 9C. The opening 101 of the first die 102 is fully open in this case. A strip of thin metal foil is inserted into the opening 101 of the first die 102 at a position corresponding to the leg portion 92 of the molding 9. Firstly, the plastic material is extruded through the opening 101, thereby forming a leading end of the side molding part 9C (shown at right-hand in FIG. 3). Under this condition, the inward wing 91a is thickest, having the water drain channel 98 formed thereon. The water drain channel 98 is widest and deepest.

The side molding part 9C is extruded to a specified length. Then, the second die 104 is downwardly moved in the direction X as shown in FIG. 9, thereby covering the opening 101 to decrease the area corresponding to the inward wing 91a. As the second die 104 is further moved in the direction X, the third die 105 is retracted in the direction W as shown in FIG. 9, thereby also decreasing the size of the water drain channel 98. The third die 105 is moved in timed relation with the moving speed of the second die 104.

At the center of the corner molding part [90B] *9B*, the third die 105 begins to shift from the opening 101 of the first die 102, thereby making the water drain channel 98 disappear from the inward wing 91a.

When the entire corner molding part 9B becomes as long as the predetermined length, the third die completely moves away from the opening 101 of the first die 102, reaching the normal position, and stopping there. The opening 101 now corresponds to the cross-sectional shape of the upper molding part 9A. Then, the upper molding part 9A will be extruded to the specified length.

The foregoing operations of the first and second dies 102, 104 are repeated to extrude the upper, corner and side molding parts 9A, 9B, 9C. If the tip of the third die 105 is very sharp, a water drain channel can be formed on the relatively thin upper molding part 9A.

Figure 10:
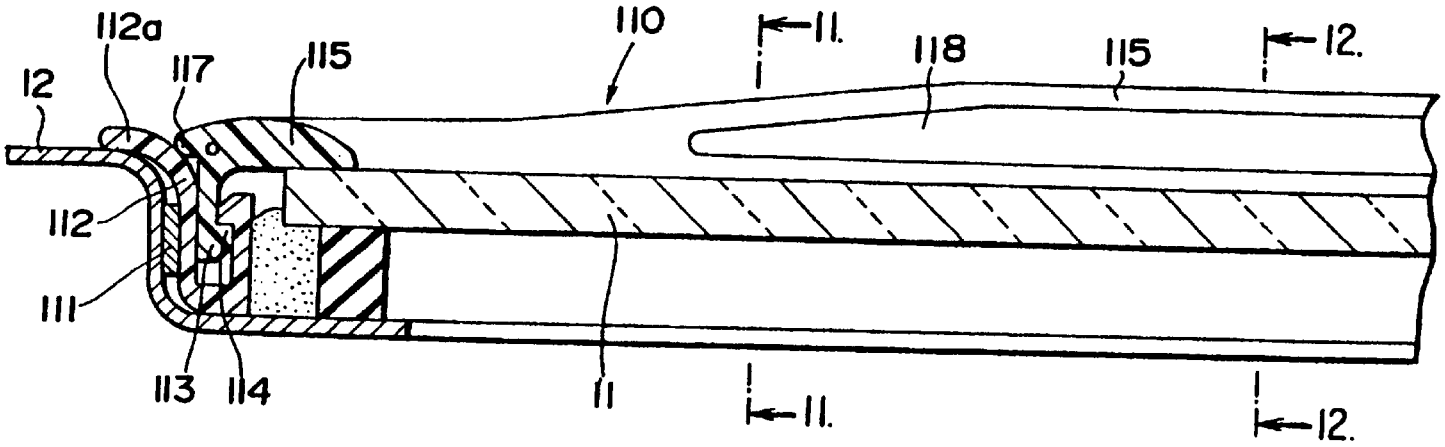
FIG. 10 is a cross-sectional view showing a molding according to a second embodiment.
Figure 12:
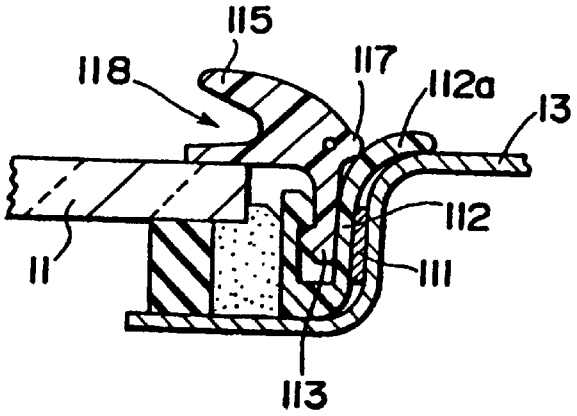
FIG. 12 is a cross-sectional view taken along line 12—12 of FIG. 9.
Figure 11:
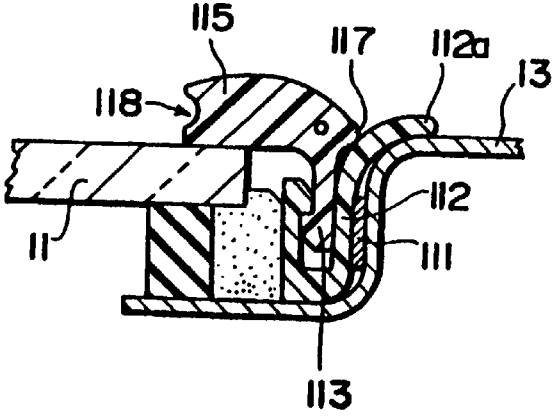
FIG. 11 is a cross-sectional view taken along line 11—11 of FIG. 9.

A molding 110 according to a second embodiment is shown in FIGS. 10 to 12. The molding 110 comprises a pair of side molding parts, an upper molding part and a pair of corner molding parts, similarly to the molding of the first embodiment. Each of the molding parts comprises a leg portion 113, a foot 114, and inward and outward wings [117,] 115, *117*.

The molding 110 is attached to the roof panel 12 and the pillar panel 13 via a fastener 112. The fastener 112 is fastened to the vehicle body panels 12, 13 by an adhesive tape 111. The fastener 112 has a U-shaped cross-section, including a lip-like member 112a. The lip-like member [112] *112a* extends upwardly along intermediate walls 12a, 13a of the vehicle body panels 12, 13. The leg portion 113 and foot 114 of the molding 110 are inserted in the fastener 112. The inward and [toward] *outward* wings 115, 117 cover peripheral edges of the windshield 11 and the vehicle body panels 12, 13.

In this embodiment, the molding 110 is shaped assuming that the vehicle body panels 12, 13 have substantially a uniform cross-sectional shape. Therefore, the molding 110 has a substantially uniform cross-sectional shape throughout the molding parts. Only the inward wing 115 changes its shape at the side molding part. Specifically, the inward wing 115 bulges at the majority of the side molding part 110C. A water drain channel 118 is formed on the large thickness portion of the inward wing 115 in the manner similar to the water drain channel of the first embodiment. Therefore, a description thereof will be omitted here. The outward wing 117 is in flexible contact with the edge of the vehicle body panels 12, 13 via the lip-like member [112] *112a* of the fastener 112.

The molding 110 is as effective as the molding of the first embodiment. The molding 110 may be firstly attached along the edge of the windshield 11, and then being installed in the window opening of the vehicle. Otherwise, the molding 110 may be installed between the windshield 11, attached in the window opening, and the vehicle body panels.

Figure 13:
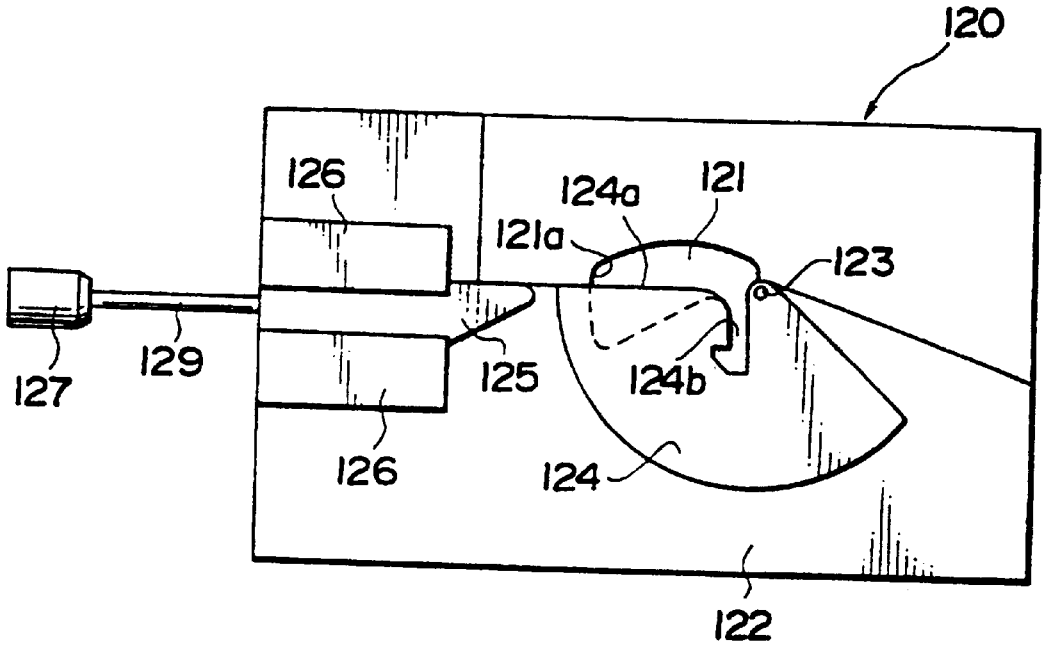
FIG. 13 is a front elevational view showing another example of a molding machine for producing the molding of FIGS. 10 to 12.

A molding machine for producing the molding 110 will be described referring to FIGS. 13 and 15. The molding machine 120 comprises first to third dies 122, 124, 125. The first die 122 is stationary, having an opening 121 corresponding to the cross-sectional shape of the inward and outward wings 115, 117 of the side molding part where no water drain channel is formed, as shown by dotted lines in FIGS. 13 and 15.

The second die 124 is sectorial, having an opening 124b, and is turned. The opening 124b corresponds to the cross-sectional shape of the leg portion 113 and the foot 114, being communicated with to the opening 121 of the first die 122. The side 124a of the second die 124 is straight according to the shape of the underside of the inward wing 115. The side 124a covers part of the opening 121 of the first die 122 in accordance with the shape of the underside of the inward wing 121. The center of the sectorial second die 124 is movable with respect to the fist die 122 via the fulcrum 123. As it is turned, the second die 124 gradually covers the opening 121 of the first die 122 to change the area of the inward wing 115.

When the second die 124 is turned, the edge of the side 124a follows an orbit whose center is the fulcrum 123. The opening 121 of the first die 122 is shaped in accordance with the orbit of the second die 124. The side 121a of the opening 121 corresponding to the inward wing 115 is arcuate based on the orbit of the second die 124. The central form of the arcuate side 121a of the opening 121 substantially agrees with the angularly movable center of the second die 124.

Figure 14:
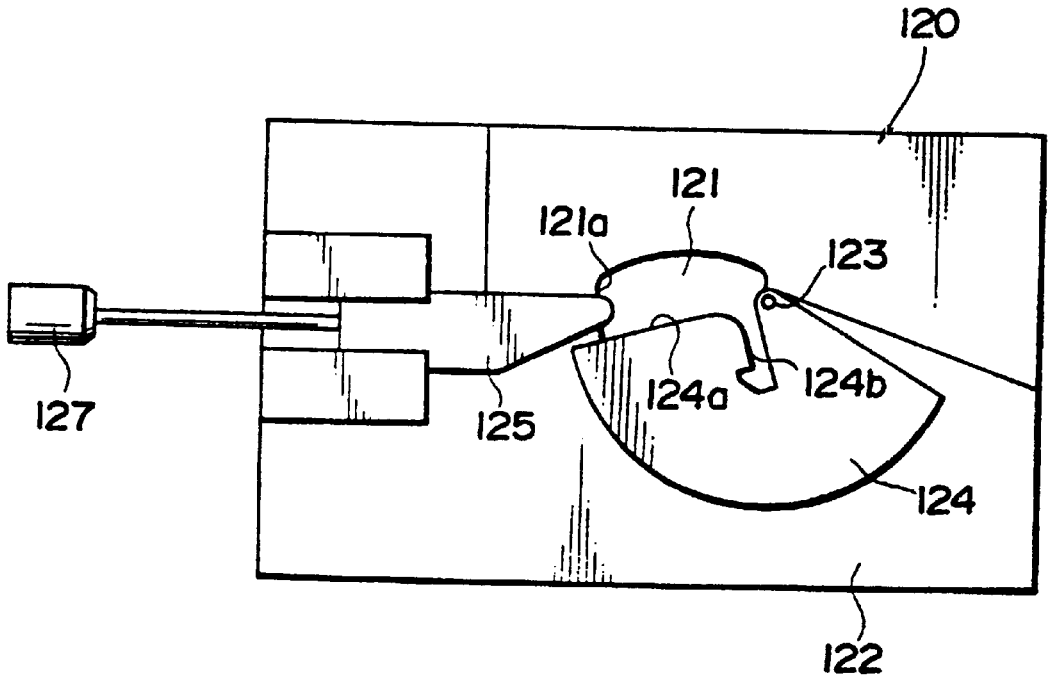
FIG. 14 is a front elevational view showing movement of dies of the molding machine.

The third die 125 is supported to be movable in parallel by a pair of guides 126, being connected to a motor [107] *127* via an operation lever 129 and a converter 108. The rotational force of the motor 127 is converted into the rectilinear motion by the converter 108, being transmitted to the third die 125. The third die 105 is movable into and from the position for forming the side molding part as shown in FIGS. 14 and 15.

The third die 125 has a triangular tip, which is movable into and from the opening 121 corresponding to the shape of the water drain channel 118 on the inward wing 115. As shown in FIGS. 13 to 15, the third die 125 is moved in response to the reciprocation of the second die 124.

In operation, the plastic material will be extruded to form the molding 110 similarly to the foregoing moldings.

Figure 15:
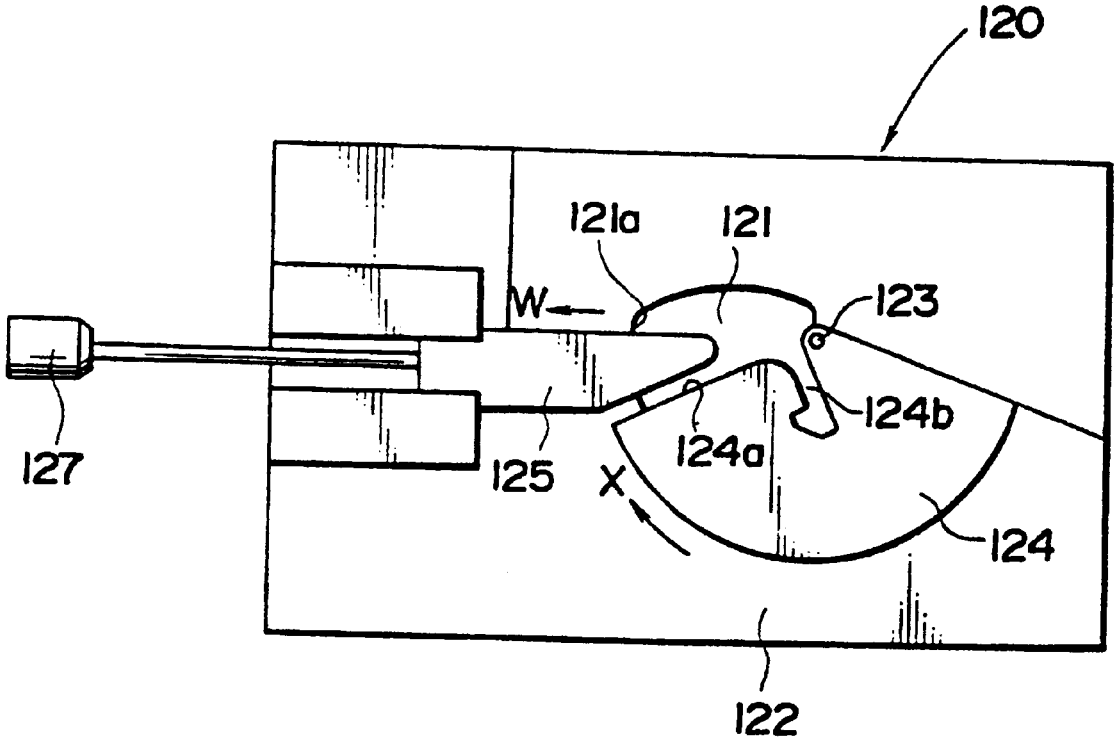
FIG. 15 is a front elevational view showing further movement of the dies of the molding machine.
Figure 16:
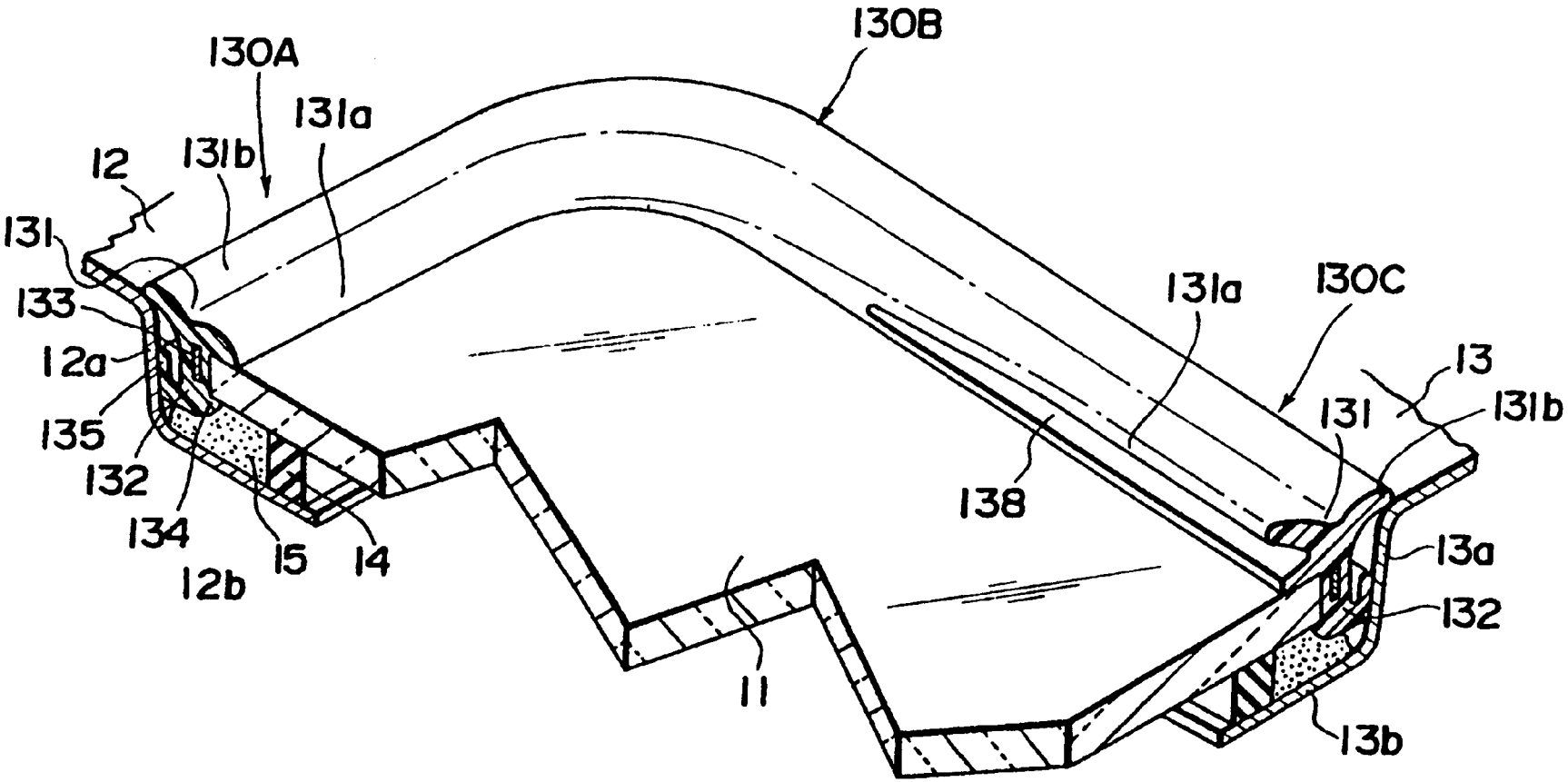
FIG. 16 is a perspective view showing the structure of a molding, at the corner portion, according to a third embodiment.
Figure 17:
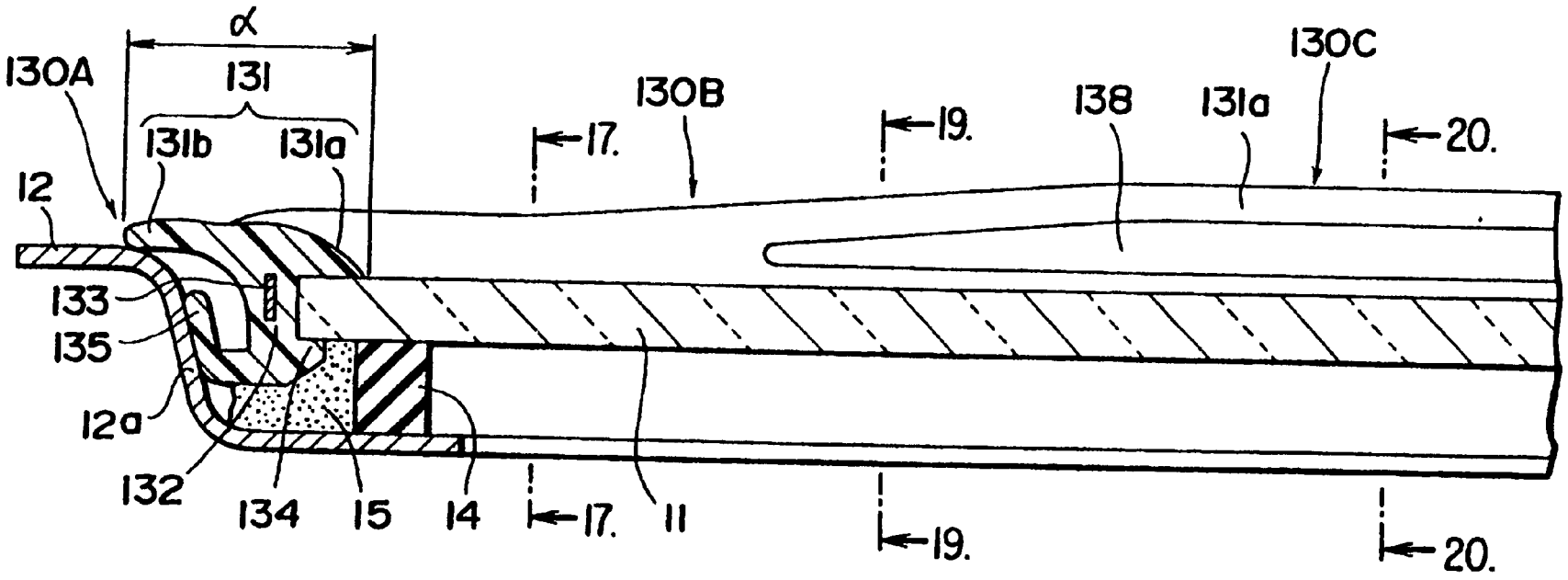
FIG. 17 is a cross-sectional view of the molding of FIG. 16

The three dies 122, 124, 125 are mutually positioned as shown in FIG. 15 to form a side molding part. The opening 121 of the first die 122 is fully open in this case. [A strip of thin metal foil is inserted into the opening 121 of the first die 122 at a position corresponding to the leg portion 92.] Firstly, the plastic material is extruded through the opening 121, thereby forming a leading end of the side molding part (shown at right-hand in FIG. 10). Under this condition, the inward wing 115 is thickest, having the water drain channel 118 formed thereon. The water drain channel 118 is widest and deepest.

The side molding part is extruded to a specified length. Then, the second die 124 is upwardly moved in the direction X as shown in FIG. 15, thereby decreasing the area of the opening 121 corresponding to the inward wing 115. As the second die 124 is further moved in the direction X, the third die 125 is retracted in the direction W as shown in FIG. 14, thereby also decreasing the size of the water drain channel 118. The third die 125 is moved in synchronization with the moving speed of the second die 124.

At the center of the corner molding part as shown in FIG. 14, the third die 105 begins to leave from the opening 121 of the first die 122, thereby making the water drain channel 118 disappear from the inward wing [91a] *115*.

When the entire corner molding part becomes as long as the predetermined length, the third die completely moves away from the opening 121 of the first die 122, reaching the normal position, and stopping there. Then the corner molding part will be extruded to the specified length. The opening 121 now corresponds to the shape of the upper molding part. Then, the upper molding part will be extruded to the specified length.

The foregoing operations of the first and second dies 122, 124 are repeated to extrude the upper, corner and side molding parts.

If the tip of the third die 125 is very sharp, a water drain channel can be formed on the relatively thin upper molding part.

The size and position of the water drain channel can be determined as desired. For instance, the water drain channel may be formed only between the center of the corner molding part to the center of the side molding part. No water drain channel may be formed from the center of the corner molding part to the upper molding part.

When the inward and outward wings are made thin to keep the molding flush with the edges of the vehicle body panels and the windshield, the molding would be unfortunately wrinkled at the corner molding parts. However, the molding is gradually thickened at the majority of the side molding part, so that the stress applied to the corner molding parts can be reduced to fit the corner molding parts smoothly.

FIGS. 16 to 20 show a molding 130 according to a third embodiment. The molding 130 is an extruded strip in the shape of T, being made of elastic material such as rubber or plastic, and comprising a pair of side molding parts and an upper molding part 130A integral with and extending between the side molding parts via corner molding parts.

Each of the side, corner and upper molding parts includes a leg portion 132 and a decorative member 131. The leg portion 132 is inserted in a space between the peripheral edge of the windshield 11 and vehicle body panels 12, 13. The decorative member 131 covers peripheral edges of the windshield 11 and vehicle body panels 12, 13.

A core metal 133 is longitudinally embedded in the leg portion 132 near the joint with the decorative member 131.

The leg 132 terminates in a foot 134 and a flexible lip 135 extending toward the vehicle body panels 12, 13.

The decorative member 131 has an inward wing 131a for covering the edge of the windshield 11, and an outward wing 131b for covering the edges of the vehicle body panels 12, 13. The inward wing 131a and the foot 134 define a U-shaped space for receiving the peripheral edge of the windshield 11.

The side, corner and upper molding parts have essentially a uniform cross-sectional shape. Specifically, the leg portion 132, foot 134, flexible lip 135 and outward wing 131b have uniform cross-sectional shapes throughout the molding parts. This is because the molding 130 is intended for a vehicle having a uniform difference of height between the upper surface of the windshield 11 and the vehicle body panels. However, the inward wing 131a of the side molding part 130C has a large thickness and width portion as shown at the lower right part of FIG. 16.

Figure 20:
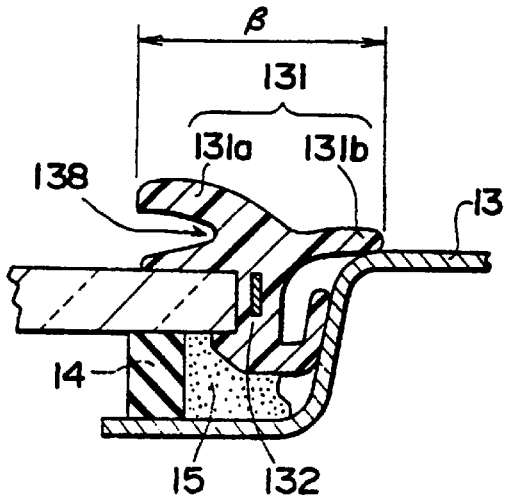
FIG. 20 is a cross-sectional view taken along line 20—20 of FIG. 17.

The inward wing 131a bulges gradually at the majority of the side molding part 130C. The inward wing 131a is thickest and widest near the center of the side molding part 130C as shown in FIG. 20, remaining thickest and widest toward the end thereof. Where the width of the decorative member 131 at the center of the side molding part 130C is represented by [α (FIG. 17)] β (*FIG. 20*), and the width of the decorative member 131 at the upper molding part is [β (FIG. 20)] α (*FIG. 17*), β is larger than α.

Figure 18:
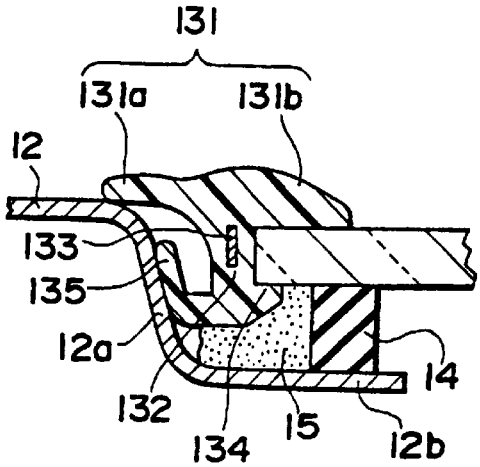
FIG. 18 is a cross-sectional view taken along line 18—18 of FIG. 16
Figure 19:
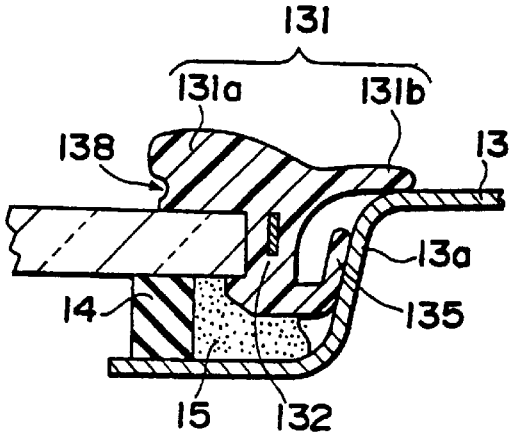
FIG. 19 is a cross-sectional view taken along line 19—19 of FIG. 17.

As it bulges gradually the inward wing 131a is formed with a wall 131c, as shown in FIGS. 18 and 19. The wall 131c has an arcuate surface whose central axis longitudinally agrees with the border between the inward wing 131a and the outward wing 131b. The arcuate surface of the wall 131c is gradually widened as the inward wing 131a bulges.

A water drain channel 138 is formed on the wall 131c of the inward wing 131a near the corner molding part (FIG. 19) to the end of the side molding part 130C (FIG. 20), being shaped like a sideways V. The size of the water drain channel 138 is varied according to the changing shape of the inward wing 131a as described above.

The molding 130 is attached around the windshield 11 in the following order, i.e. the side molding part 130C, corner molding part 130B, upper molding part 130A, corner molding part 130B, and side molding part 130C. Specifically, the peripheral edge of the windshield 11 is received in the space formed by the inward wing 131a, leg portion 132 and foot 134 of the molding 130. The corner molding part 130B is curved according to the shape of the corner of the window opening, being attached without wrinkles, since the side molding part 130C is gradually thickened.

A dam rubber 97 in the strip shape is fastened on flanges 12b, 13b of the vehicle body panels 12, 13. An adhesive [96] *15* is filled between the dam rubber [97] *14* and the flanges 12b, 13b. The windshield 11 with the molding 130 attached therearound is placed on the dam rubber [97] *14*, so that the foot 134 is positioned by the dam rubber 97, and the flexible lip 135 is bent in the L-shape to come into flexible contact with slanting walls 12a, 13b of the body panels 12, 13. Thus, the molding 130 is firmly fixed in the specified position.

The windshield 11 is attached on the flanges 12b, 13b at a uniform height. The positional relationship between the molding 130 and the vehicle body panels is uniform throughout the whole area.

With the molding 130, the water drain channel 138 guides fluid such as rain water on the windshield 11 to a specified position.

The molding 130 is firstly attached around the windshield 11, and then installed in the window opening of the vehicle body panels. Otherwise, the molding 130 is inserted in the space between the windshield, which has been already attached in the window opening, and the vehicle body panels.

A molding machine 140 for producing the molding 130 will be described with reference to FIGS. 21 and 24.

The molding machine 140 includes first to third dies for extruding plastic material. The first die 142, second die 144 and third die 145 are positioned in parallel to the direction (perpendicular to the plane of FIG. 21) in which the molding 130 is to be extruded.

The first die 142 is stationary, having an opening 141 corresponding to the cross-sectional shape of the molding 130. A portion of the opening 141, which corresponds to the inward wing 131a, is adjusted with respect to it's shape by moving the second die 144 as shown by dotted lines in FIGS. 21 and 24 to form the bulging inward wing 131a.

The second and third dies 144, 145 are of plate members, being supported to be movable in front of the first die 142. The second die 144 is substantially sectorial and is turned. An arcuate side 144a of the second die 144 is shaped according to the contour of the inward wing 131a. The second die 144 is positioned over the opening 141 at the portion for forming the inward wing 131a. The second die 144 is movable centrally of a fulcrum 143, which is located at a position corresponding to the border between the inward and outward wings 131a, 131b, being operated to change the shape of the opening 141 according to the shape of the inward wing 131a.

When the second die 144 is turned, the outer edge of the side 144a in the radius direction follows an arcuate orbit. The side 141a of the opening 141 of the first die 142 and the outer edge of the side 144a of the second die [104] *144* are formed in arc in accordance with the arcuate orbit of the second die 144. The center of the arcuate form of the side 141a of the opening 141 substantially agrees with the movement center 143 of the second die [142] *144*.

The third die 145 is guided by a pair of guides 146 to be rectilinearly movable. The third die 145 is connected to a motor 147 via an operating lever 149 and a converter 148. The rotary motion of the motor 147 is converted into the rectilinear motion by the converter 148, so that the third die 145 is reciprocated between the positions for making the upper molding part and the side molding part.

The third die 145 has a triangular tip, which is movable into and from the opening 141 corresponding to the shape of the water drain channel 138 on the inward wing 131a. As shown in FIGS. 21 to 24, the third die 145 is operated in response to the operation of the second die 144.

In operation, plastic material will be extruded to form the molding 130 in the strip shape in the order of the side molding part 130C, corner molding part 130B, upper molding part 130A, corner molding part 130B, and side molding part 130C.

Figure 24:
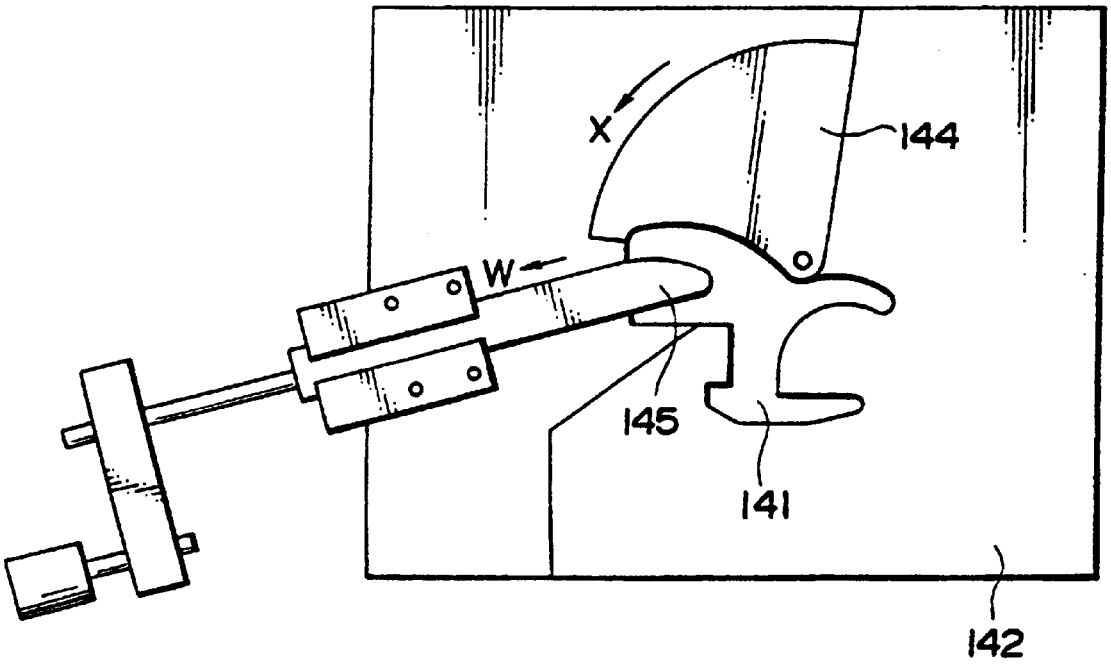
FIG. 24 is a front elevational view showing still further movement of the dies of the molding machine.

The three dies 142, 144, 145 are mutually positioned as shown in FIG. 24 to form a side molding part 130C. The opening 141 of the first die 142 is fully open in this case. A strip of thin metal foil is inserted into the opening 141 of the first die 142 at a position corresponding to the leg 132 of the molding 130. Firstly, the plastic material is extruded through the opening 141, thereby forming a leading end of the side molding part 130C (shown at right-hand in FIG. 17). Under this condition, the inward wing 131a is thickest and widest, having the water drain channel 138 formed thereon. FIG. 20 shows the cross section of the side molding part 130C. The water drain channel 138 is widest and deepest.

The side molding part 130C is extruded to a specified length. Then, the second die 144 is downwardly moved in the direction X as shown in FIG. 24, thereby covering the opening 141 to decrease the area corresponding to the inward wing 131a. As the second die 144 is further moved in the direction X, the third die 145 is retracted in the direction W as shown in FIG. 24, thereby also decreasing the size of the water drain channel 138. The third die 145 is moved in timed relation with the moving speed of the second die 144.

Figure 22:
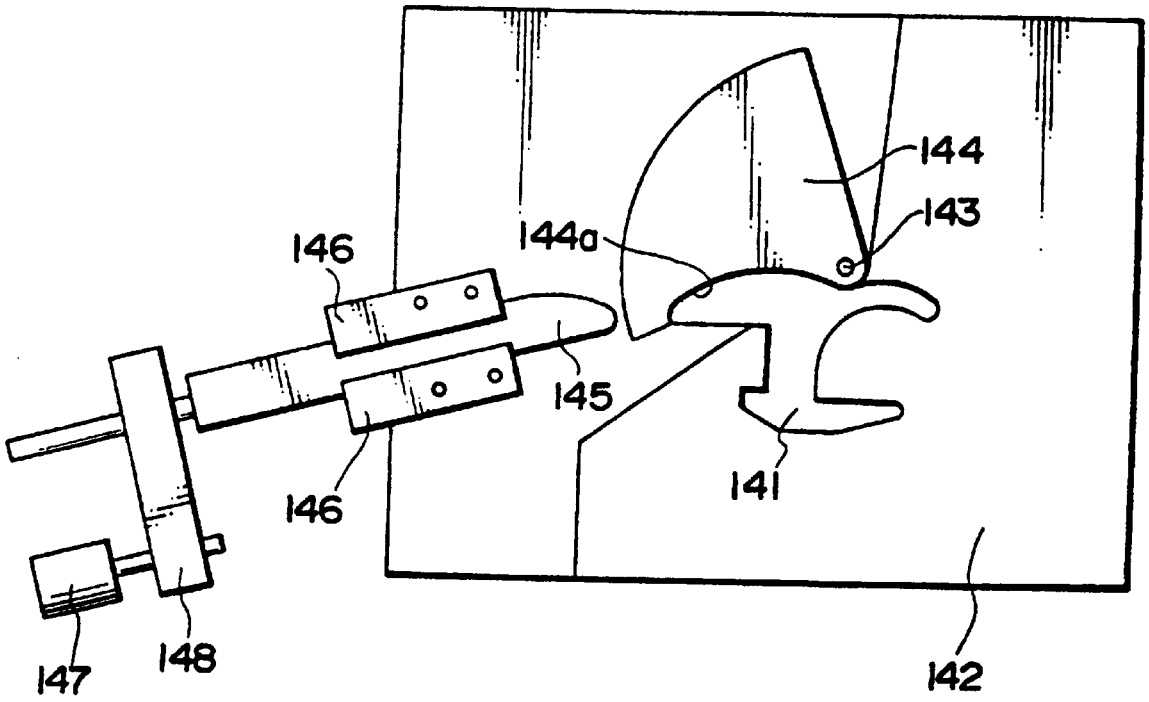
FIG. 22 is a front elevational view showing movement of dies of the molding machine of FIG. 21.
Figure 23:
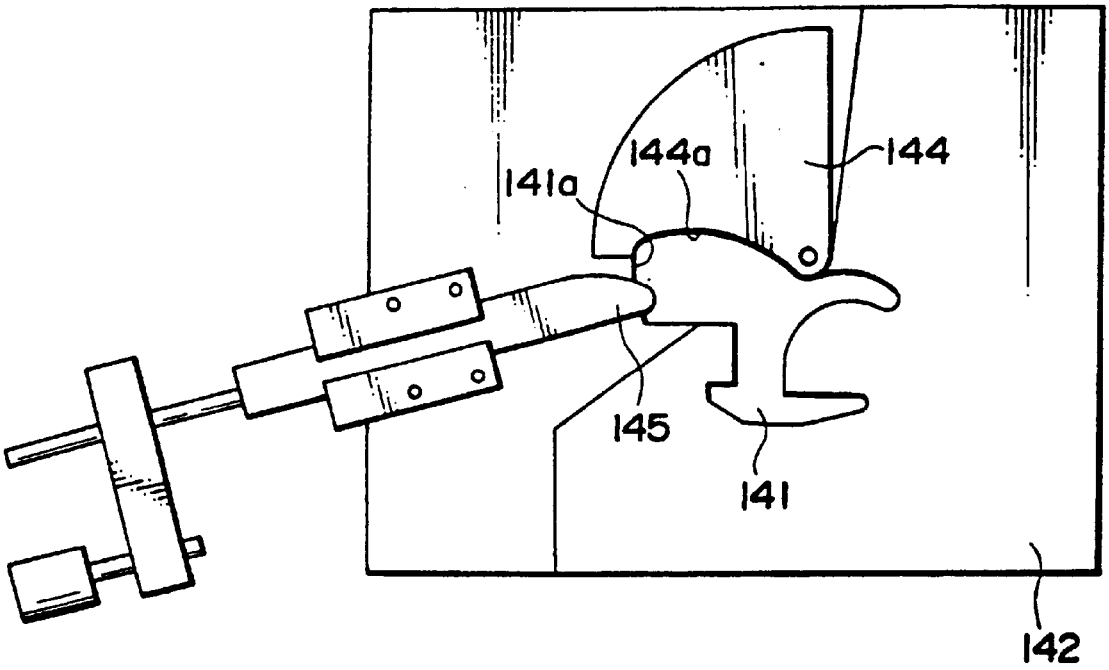
FIG. 23 is a front elevational view showing further movement of the dies of the molding machine.

At the center of the corner molding part 130B, the third die 145 begins to leave from the opening 141 of the first die 142, thereby making the water drain channel 138 disappear from the inward wing 131a as shown in FIG. 19. The second and third dies 144, 145 are positioned for the first die 142 as shown in FIG. 22 to form the corner molding part 130B. When the entire corner molding part 130B becomes as long as the predetermined length, the third die 145 completely moves away from the opening 141 of the first die 142. The area of the opening 141 is being decreased.

Figure 21:
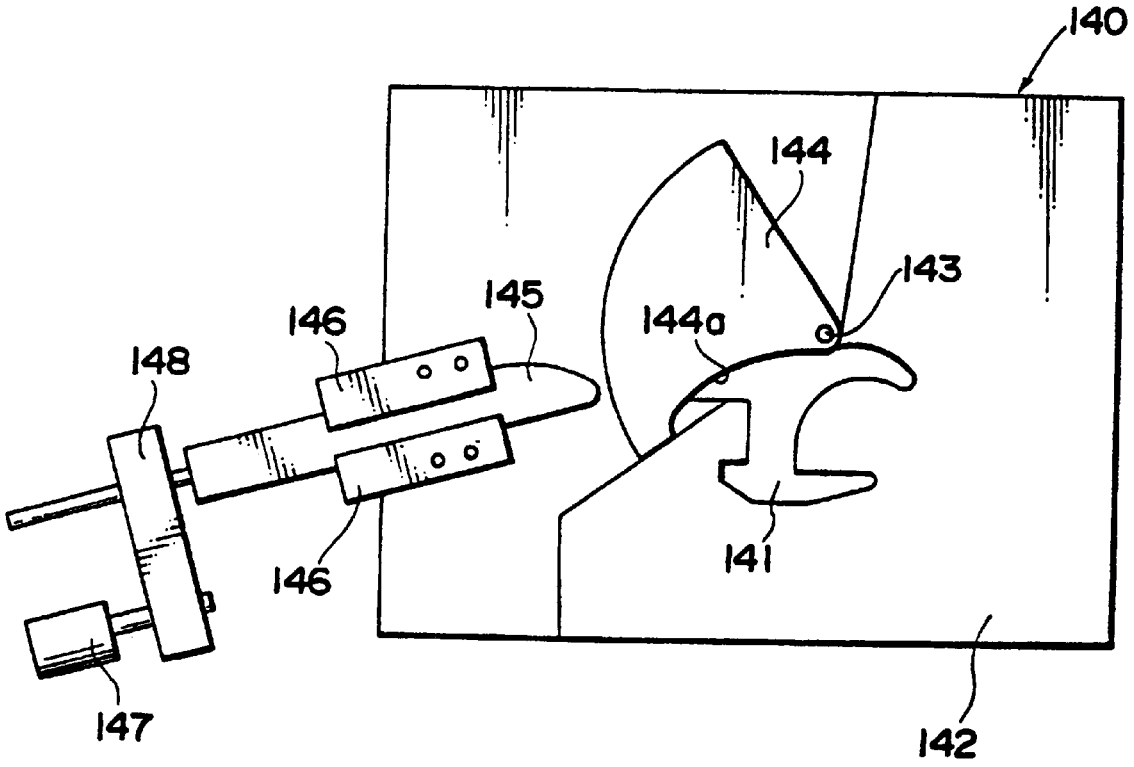
FIG. 21 is a front elevational view of a molding machine for producing the molding of FIGS. 16 to 20.

Then the second die 144 is stopped at its final position as shown in FIG. 21. The opening 141 of the first die 142 is smallest, corresponding to the cross-sectional shape of the upper molding part 130A. Then, the upper molding part 130A will be extruded to the specified length.

The foregoing operations of the molding machine 140 are repeated to extrude the upper, corner and side molding parts 130A to 130C. If the tip of the third die 145 is very sharp, a water drain channel can be formed on the relatively thin corner molding part 130B.

Figure 25:
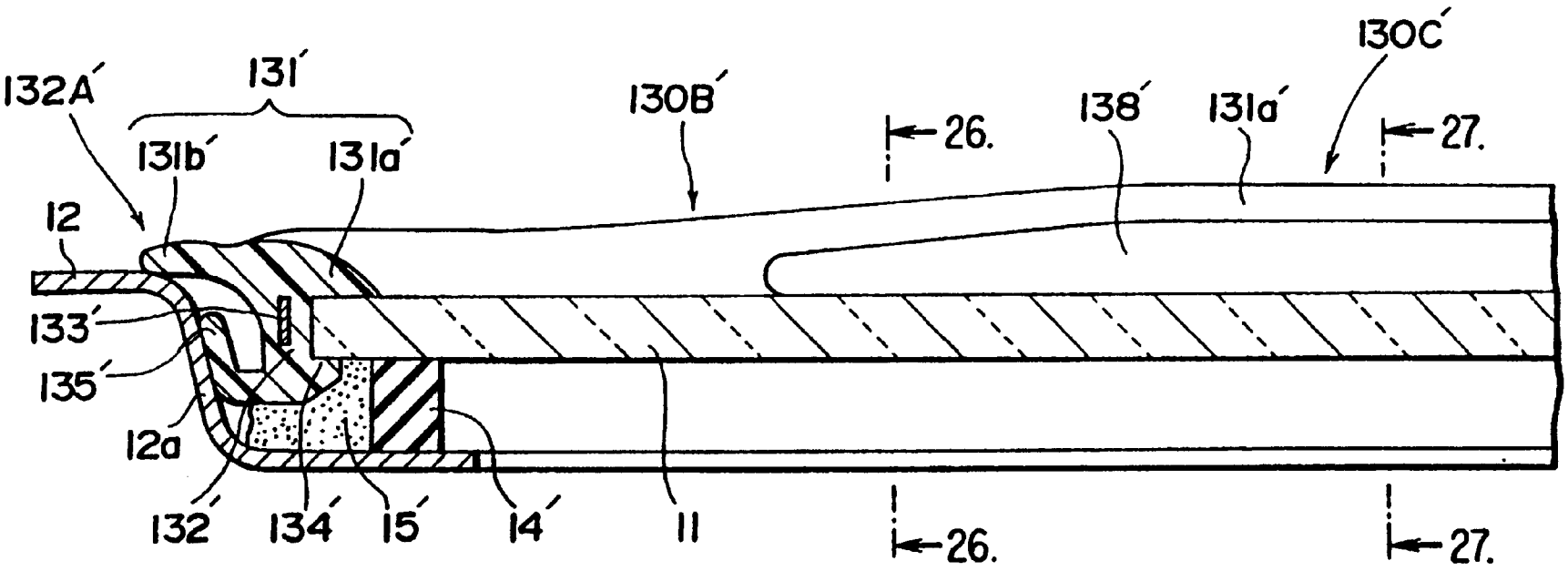
FIG. 25 is a cross-sectional view of a molding according to a fourth embodiment.
Figure 26:
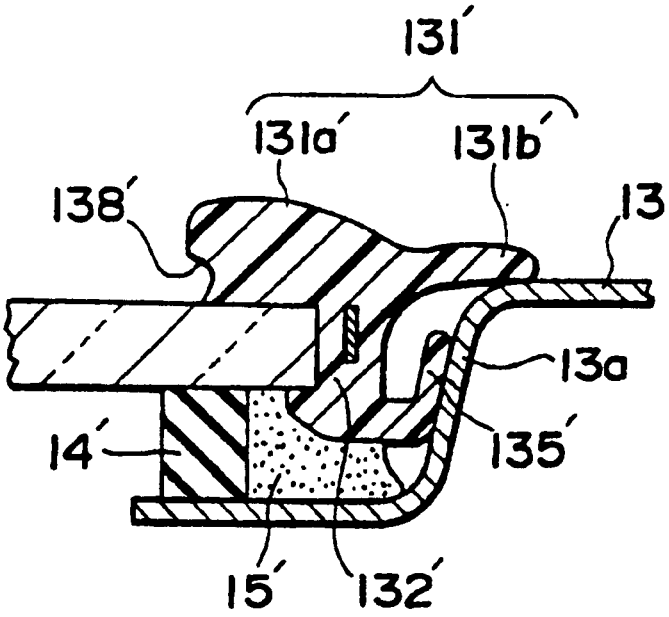
FIG. 26 is a cross-sectional view taken along line 26—26 of FIG. 25.
Figure 27:
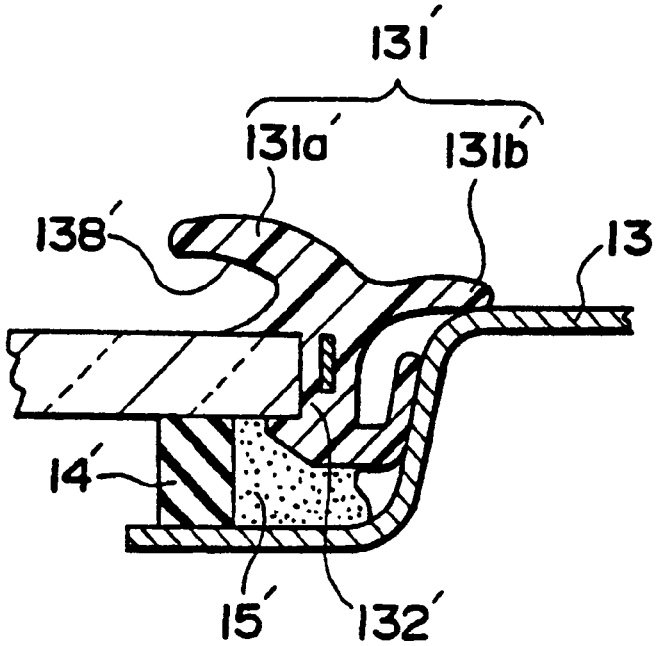
FIG. 27 is a cross-sectional view taken along line 27—27 of FIG. 25.
Figure 28:
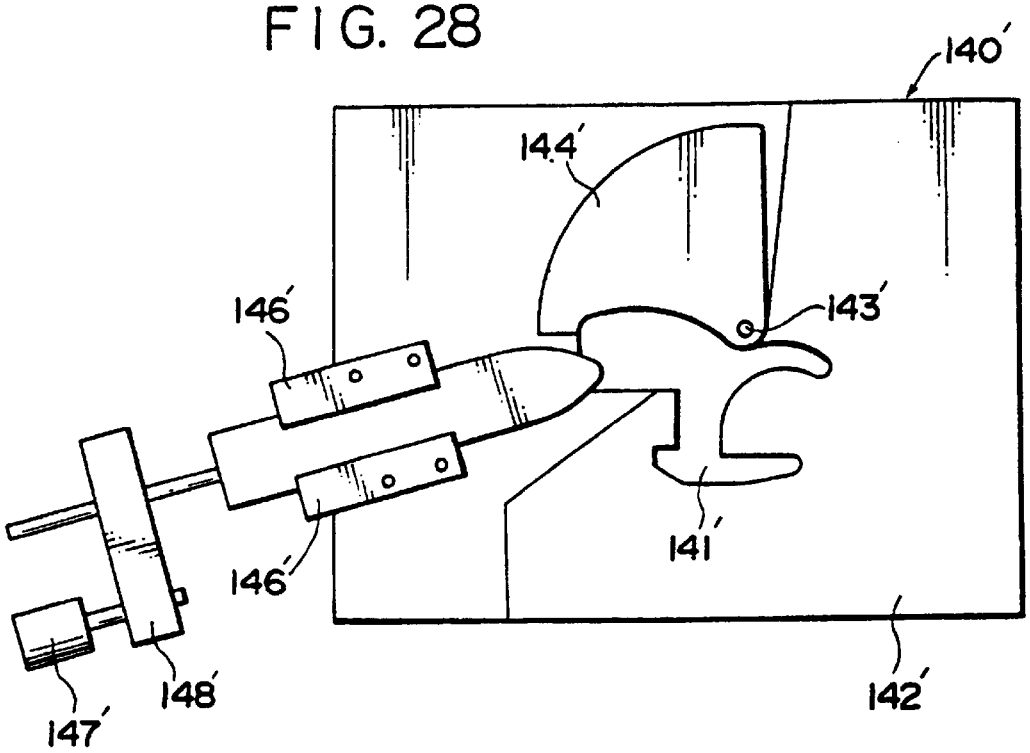
FIG. 28 is a front elevational view of a molding machine for producing the molding of FIGS. 25 to 27.
Figure 29:
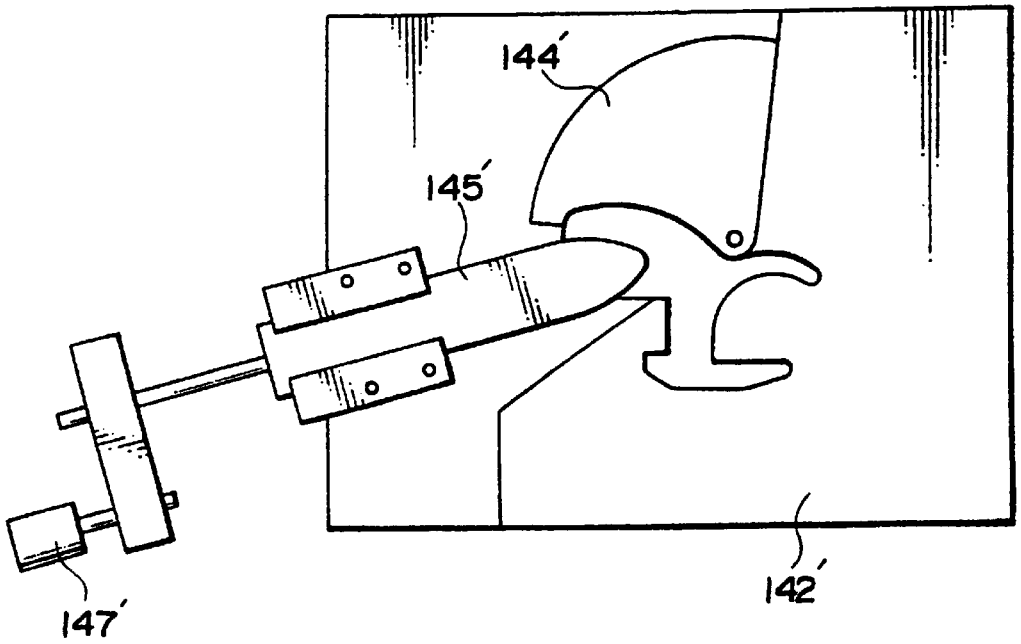
FIG. 29 is a front elevational view showing movement of dies of the molding machine.
Figure 30:
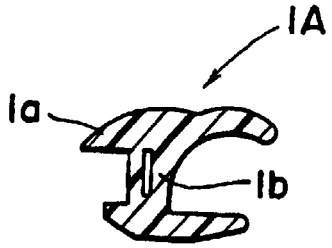
FIG. 30 is a cross-sectional view showing an upper molding part proposed in the co-pending application.
Figure 31:
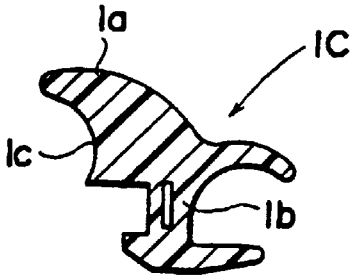
FIG. 31 is a cross-sectional view showing a side molding part of the molding of FIG. 30.
Figure 32:
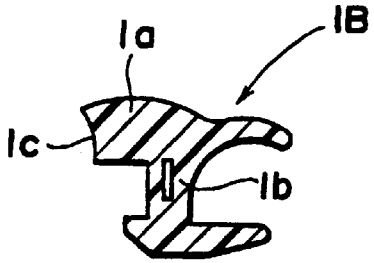
FIG. 32 is a cross-sectional view showing a corner molding part.
Figure 33:
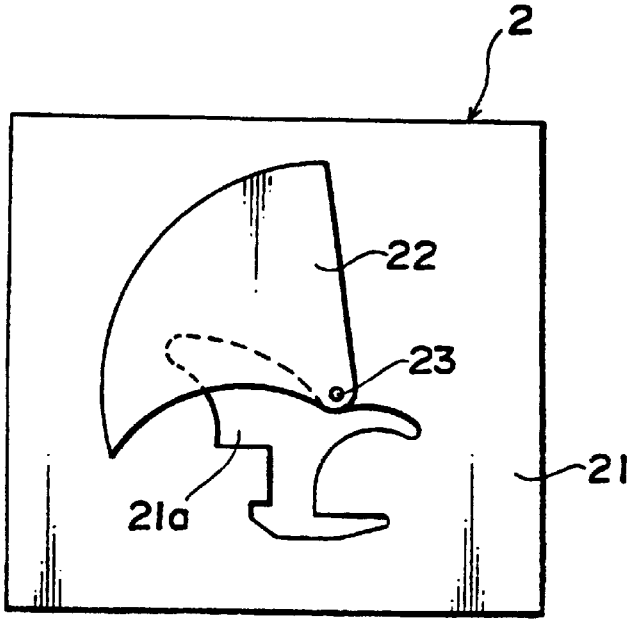
FIG. 33 is a front elevational view showing an example of a molding machine for manufacturing the molding of FIGS. 30 to 32.

FIGS. 25 to 27 show a molding according to fourth embodiment of the invention. This molding is essntially identical to the foregoing molding 130. The parts identical to those of the foregoing embodiment are denoted by the reference numberals with; "'". The molding 130' has a large water drain channel 138' compared with the water drain channel 138 of the third embodiment. At the side molding part, the inward wing 131a' is somewhat narrowed as compared with the inward wing 131 of the third embodiment.

The large water drain channel 138' can guide more rain water than the water drain channels of the foregoing embodiments.

With this embodiment, the molding 130' is firstly attached around the peripheral edge of the windshield 11, then being installed in the window opening of the vehicle. Otherwise, the windshield 11 is firstly attached in the window opening, and then the molding 130' is installed in the space between the windshield 11 and the vehicle body panels 12, 13.

A molding machine for producing the molding 130' has the structure same as the molding mahine 140 for the molding 130.; "'" is added to the parts identical to those of the molding machine 140. The third die 145' of this embodiment is wider than the third die 145 of the foregoing embodiment. The third die 145' covers a large area of the opening 141' of the first die 142 as compared with the foregoing embodiment, so that the water drain channel 138' having a large width can be formed.

The molding 130' will be manufactured in the manner same as the manner for producing the moldings of the foregoing embodiments.

The foregoing moldings can also be used to install a rear window as well as the windshield.

Obviously, numerous modifications and variations of the present invention are possible in light of the above teachings. It is therefore to be understood that within the scope of the appended claims, the invention may be practiced otherwise than as specifically described herein.

What is claimed is:

1. A method of producing a strip of an automobile windshield molding for sealing a space between a windshield and a window opening of a vehicle body using a molding machine, the molding machine including a first die having an opening corresponding to a cross-sectional shape of a molding, a [sectorial] second die having an arcuate side corresponding to [the] *a* cross-sectional shape of part of the molding and being [turned] *turnable* to cover part of the opening of the first die to change the area of the opening, and a third die rectilinearly movable into and from the opening of the first die, said method comprising:

(a) extruding molding material through the opening formed by the first and second dies to form [a pair of side molding parts, a pair of corner molding parts and an upper molding part] *parts* of the molding, *said parts including a first molding part and other molding parts*;

(b) changing the shape of the opening by moving the dies according to [the] cross-sectional shapes of the [side, corner and upper] molding parts to be made;

(c) turning the second die in a direction so as to widen part of the opening of the first die and so as to increase a thickness of the molding material [in the sector shape at a portion] *and create a large thickness portion of the molding material* corresponding to the cross-sectional shape of [the side] *the first* molding part;

(d) advancing the third die into the widened part of the opening with [the] *a* specified timing so as to form a water drain channel on the large thickness portion of the [side] *first* molding part; and (e) performing at least one of turning the second die and shifting the third die for reducing part of the opening so as to decrease [the] *a* thickness of the [widened part of the] molding material and for making [each of the corner and upper] *the other* molding parts.

2. A method according to claim 1, wherein the [sectoral] second die has an arcuate edge corresponding to [the] *a* cross sectional shape of part of the molding[, and which comprises turning the second die in the direction to widen part of the opening of the first die so as to form a side molding part having a large thickness and width portion].

*3. A method according to claim 1, wherein the first die has an arcuate edge in a side of the opening in accordance with an arcuate orbit of the second die.*

*4. A method according to claim 1, wherein the opening of the first die includes a part for extruding a leg.*

*5. A method of producing a strip of an automobile windshield molding for sealing a space between a windshield and a window opening of a vehicle body using a molding machine, the molding machine including a first die having an opening including an arcuate side corresponding to a cross-sectional shape of a molding, a second die having a side corresponding to the cross-sectional shape of part of the molding and being turnable to cover part of the opening of the first die to change the area of the opening, and a third die rectilinearly movable into and from the opening of the first die, said method comprising:*

*(a) extruding molding material through the opening formed by first and second dies to form parts of the molding, said parts including a first molding part and other molding parts;*

*(b) changing the shape of the opening by moving at least one of the second and third dies according to cross-sectional shapes of molding parts to be made;*

*(c) turning the second die in a direction so as to widen part of the opening of the first die and form a large thickness portion of the molding material corresponding to the cross-sectional shape of the first molding part;*

*(d) advancing the third die into the widened part of the opening with a specified timing so as to form a water drain channel on the large thickness portion; and*

*(e) performing at least one of turning the second die and shifting the third die for reducing part of the opening so as to decrease the thickness of the large thickness portion of the molding material when making the other molding parts.*

*6. A method according to claim 4, wherein the first die has an arcuate side corresponding to a cross sectional shape of part of the molding.*

*7. A method according to claim 4, wherein the first die has an arcuate edge in a side of the opening in accordance with an arcuate orbit of the second die.*

*8. A method according to claim 5, wherein the side of the second die includes a part for extruding a leg.*

*9. A method according to claim 1, wherein the first molding part corresponds to a side molding part installed at a side periphery of a windshield, and the other molding parts correspond to a corner and an upper molding part installed at a corner and an upper periphery of the windshield.*

*10. A method of producing a strip of an automobile windshield molding for sealing a space between a periphery of a windshield and a window opening of a vehicle body panel using a molding machine, the molding machine including a plurality of dies including a rotatable die, comprising the steps of:*

*(a) extruding molding material as a plurality of molding parts having different cross-sectional shapes;*

*(b) extruding a large thickness portion as one of said plural molding parts while increasing a thickness of the large thickness portion along a longitudinal direction of the molding by rotating the rotatable die;*

*(c) forming a wall shaped as an arcuate surface when the large thickness portion is being extruded; and*

*(d) forming a water drain channel on the well of the large thickness portion of the molding.*

*11. A method of producing a strip of an automobile windshield molding for sealing a space between a periphery of a windshield and a window opening of a vehicle body panel using a molding machine the molding machine including a plurality of dies defining an extrusion opening having a cross-sectional area which is changed by moving at least one of said dies, the dies including a rotatable die and another rectilinearly movable die, said method comprising the steps of:*

*(a) extruding molding material through said opening as a plurality of molding parts while changing cross-sectional shapes of said plurality of molding parts by changing the area of said opening;*

*(b) extruding a large thickness portion as one of said plural molding parts while increasing a thickness of the large thickness portion along a longitudinal direction of the molding by rotating the rotatable die to widen the area of said opening;*

*(c) forming a wall shaped as a circular surface when the large thickness portion is being extruded; and*

*(d) forming a water drain channel on the wall of the large thickness portion of the molding by advancing the another movable die into the widened area of said opening.*

*12. A method of producing a strip of an automobile windshield molding according to claim 10 or 11, wherein the step of extruding molding material as plural molding parts includes a step of extruding a side molding part corresponding to a side periphery of a windshield, a corner molding part corresponding to a corner periphery of the windshield, and an upper molding part corresponding to an upper periphery of the windshield.*

* * * * *